US007417634B2

(12) United States Patent
Cameron et al.

(10) Patent No.: US 7,417,634 B2
(45) Date of Patent: Aug. 26, 2008

(54) THREE DIMENSIONAL DISPLAY

(75) Inventors: Colin D Cameron, Malvern (GB); Peter C Cowling, Malvern (GB)

(73) Assignee: F. Poszat Hu, LLC, Wilmington, DE (US)

( * ) Notice: Subject to any disclaimer, the term of this patent is extended or adjusted under 35 U.S.C. 154(b) by 13 days.

(21) Appl. No.: 11/483,980

(22) Filed: Jul. 11, 2006

(65) Prior Publication Data

US 2007/0040829 A1    Feb. 22, 2007

Related U.S. Application Data

(63) Continuation of application No. 10/415,982, filed as application No. PCT/GB01/04886 on Nov. 5, 2001, now abandoned.

(60) Provisional application No. 60/247,011, filed on Nov. 13, 2000.

(30) Foreign Application Priority Data

Nov. 7, 2000    (GB) .................................. 0027104.9

(51) Int. Cl.
*G06T 15/00* (2006.01)
*G06T 15/40* (2006.01)
*G06T 15/30* (2006.01)
*G06T 17/00* (2006.01)
*G03H 1/08* (2006.01)

(52) U.S. Cl. ...................... 345/419; 345/421; 345/423; 345/428; 359/9

(58) Field of Classification Search ................ 345/419, 345/428, 421, 423; 359/9
See application file for complete search history.

(56) References Cited

U.S. PATENT DOCUMENTS 3,829,838 A  *  8/1974  Lewis et al. ................. 345/419

(Continued)

FOREIGN PATENT DOCUMENTS

EP          0 590 828 A2     4/1994

(Continued)

OTHER PUBLICATIONS

Ichioka et al., "Optical information processing", Proceedings of the IEEE, vol. 84, Issue 5, pp. 694-719, May 1996.*

(Continued)

*Primary Examiner*—Ulka Chauhan
*Assistant Examiner*—Roberta Prendergast
(74) *Attorney, Agent, or Firm*—Stolowitz Ford Cowger LLP

(57) ABSTRACT

The invention provides an improved means for displaying computer generated hologram (CGH). Images appearing in the image volume are realised as a set of planar facets that approximate to the shape of the original object to be displayed. These facets are populated with points, that act as the visible parts of the displayed image. When an object is displayed, certain facets will not be face on the viewing zone. This will result in an apparent surplus of points on these facets, which is wasteful of computing effort. The current invention thus provides for certain facets to be denuded of points if these facets are not presented face on to the viewing zone of the CGH. The invention is mainly applicable for producing CGHs using the interference based algorithm, but can also be used in other types of 3D display that make up objects from an array of points.

22 Claims, 1 Drawing Sheet

U.S. PATENT DOCUMENTS

Figure 1:
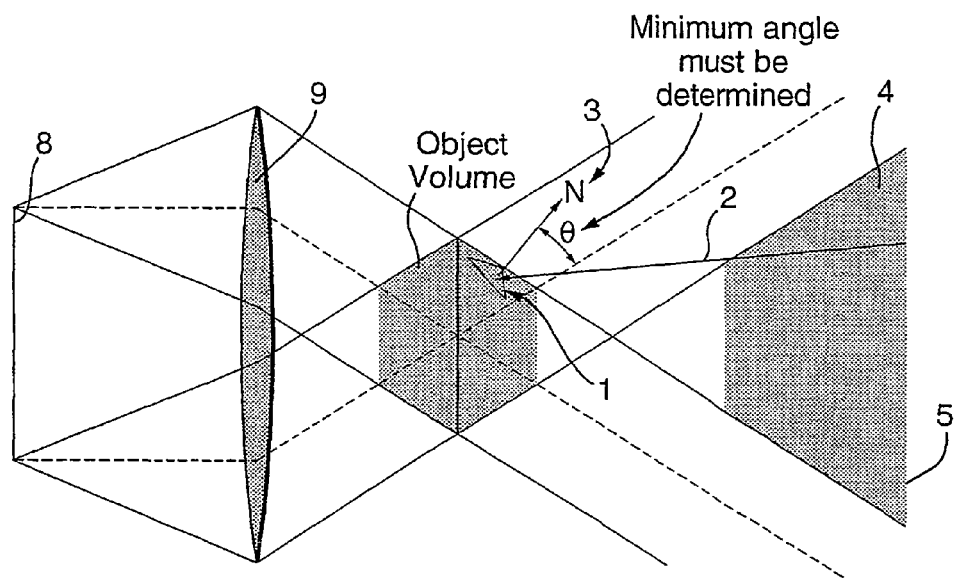

| | | | |
|---|---|---|---|
| 3,957,353 A * | 5/1976 | Fienup et al. | 359/564 |
| 4,695,973 A * | 9/1987 | Yu | 708/816 |
| 4,701,006 A * | 10/1987 | Perlmutter | 359/9 |
| 5,039,223 A * | 8/1991 | Gemma et al. | 356/458 |
| 5,119,214 A * | 6/1992 | Nishii et al. | 359/7 |
| 5,194,971 A * | 3/1993 | Haines | 359/9 |
| 5,220,622 A * | 6/1993 | Scarr | 382/210 |
| 5,347,375 A * | 9/1994 | Saito et al. | 359/9 |
| 5,400,155 A * | 3/1995 | Ueda et al. | 359/9 |
| 5,483,364 A * | 1/1996 | Ishimoto et al. | 359/9 |
| 5,610,733 A * | 3/1997 | Feldman et al. | 359/9 |
| 5,652,666 A * | 7/1997 | Florence et al. | 359/22 |
| 5,666,226 A * | 9/1997 | Ezra et al. | 359/621 |
| 5,682,214 A * | 10/1997 | Amako et al. | 349/74 |
| 5,724,447 A * | 3/1998 | Fukushima | 382/211 |
| 5,812,434 A * | 9/1998 | Nagase et al. | 703/2 |
| 5,891,030 A * | 4/1999 | Johnson et al. | 600/407 |
| 5,914,721 A * | 6/1999 | Lim | 345/421 |
| 5,923,331 A * | 7/1999 | Dusseux et al. | 345/421 |
| 5,929,860 A * | 7/1999 | Hoppe | 345/419 |
| 5,953,013 A * | 9/1999 | Shimizu | 345/419 |
| 5,963,209 A * | 10/1999 | Hoppe | 345/419 |
| 6,016,224 A * | 1/2000 | Namiki | 359/619 |
| 6,025,938 A * | 2/2000 | Kathman et al. | 359/9 |
| 6,046,744 A * | 4/2000 | Hoppe | 345/419 |
| 6,172,679 B1 * | 1/2001 | Lim | 345/421 |
| 6,373,489 B1 * | 4/2002 | Lu et al. | 345/428 |
| 6,437,919 B1 * | 8/2002 | Brown et al. | 359/621 |
| 6,498,607 B1 * | 12/2002 | Pfister et al. | 345/423 |
| 6,618,047 B1 * | 9/2003 | Lim | 345/421 |
| 6,639,597 B1 * | 10/2003 | Zwicker et al. | 345/427 |
| 7,068,403 B2 * | 6/2006 | Kitamura | 359/9 |

FOREIGN PATENT DOCUMENTS

| | | |
|---|---|---|
| EP | 0 880 110 A | 11/1998 |
| WO | 99/39308 A | 8/1999 |

OTHER PUBLICATIONS

Ihori et al.; "Fast optical measurement of nonuniform electric field vector mapping in a dielectric liquid" Dielectric Liquids, 1999. (ICDL '99) Proceedings of the 1999 IEEE 13th International Conference on Jul. 20-25, 1999 pp. 345-348.*

Article; "2001-A Holographic Odyssey"; Eureka, Feb. 2001, p. 20 and 21.

* cited by examiner

THREE DIMENSIONAL DISPLAY

This application is a Continuation of Application No. 10/415,982, filed May 6, 2003 now abandoned, which is the US national phase of International Application PCT/GB01/04886, filed in English on 5 November 2001, which designated the US. PCT/GB01/04886 claims priority to GB Application No. 0027104.9 filed 7 Nov. 2000 and US Provisional Application No. 60/247,011 filed 13 Nov. 2000. The entire contents of these applications are incorporated herein by reference.

This invention relates to a method of, and system for, representing three-dimensional objects. More specifically, it relates to methods of reducing the large computational loads associated with the computation of computer generated holograms when parts of three dimensional objects are not presented fully face-on to the observer. It also relates to systems capable of implementing the methods presented.

PRIOR ART

In performing the calculations required to display a computer generated hologram (CGH), it is necessary to populate the object to be displayed with an array of points that, when seen from a suitable distance, appear as a continuum. It is usual in computer graphics fields to quantize the object to be displayed into a series of planar facets that approximate to the actual shape. The points that make up the object are populated onto these facets. An observer viewing such an object from a sufficiently large distance will tend to see not the individual points but instead the complete object as if it were drawn with continuous lines or areas of colour. For this to occur there must be a sufficient density of points such that the eye cannot distinguish between adjacent points. The human eye can resolve two points if the angle subtended from the eye to the points is typically greater than one minute of arc (290μ radians). By knowing the minimum eye to object distance likely to arise, a minimum object point population density can be calculated.

It will be known by a person skilled in the art that CGHs are projected from a diffracting panel. In this specification this diffracting panel is known as the CGH design plane, or CDP. Each point making up the object requires some processing effort to be expended, so the point density should not be too great.

Problems exist with the current methods when a facet is not presented fully face-on to some viewing point. Unnecessary points result in more computation effort.

It is an intention of the present invention to improve image quality of objects displayed on 3D CGH displays.

It is also an intention of the present invention to improve the processing times required in generating 3D objects in a CGH display system.

STATEMENT OF INVENTION

According to the present invention, there is provided a method for representing a three dimensional object in a computer system capable of displaying the object in three dimensions wherein a surface of the object is approximated by at least one planar facet which has an associated point density, characterised in that the point density is reduced on the facet if a normal from any point on the facet projected towards the view volume cannot intersect with part of the view volume.

CGH display systems make up a complete image by generating a set of polygons, herein known as facets, each of which is planar, arranged to approximate to the true shape of the object being displayed. If the object has curves, then the smaller these facets are, the closer they are able to provide a true representation of these curved areas. These facets will generally be of differing sizes and will abut each other at different angles. In general, the facets will not be in a single plane, but will each be in a plane appropriate to the part of the object to which it is approximating. The facets will then be populated with object points. Each of these points forms a basic element of the picture, and taken together, these points make up the object to be displayed. Thus, some computation effort is needed to process each of the points.

One way of populating the facets with points is to merely assume that each needs to be populated such that the density criterion given above is achieved, i.e. populate every facet with points of such a density as to meet the criteria given above. However, as the plane of each facet is in general different, not all facets will be seen by the viewer face-on. This is because all 3D CGH systems have a limited angle of view of the object. Some facets will be able to be seen face-on by selecting a viewing point appropriately within the view volume, whereas others will never be able to be seen face-on. A facet can be seen face-on if a normal vector coming from it is capable of entering the eye of a viewer who is looking from within the view volume of the CGH system. In practice, the view volume is defined as the volume that is bounded by the planes defined by the angle of view of the CGH and two planes coplanar with the CDP that define a minimum and maximum view distance.

If a facet is not face-on to a viewer, then the viewer of the facet will see that facet as apparently brighter, due to the increased apparent density of points. This effect gets more pronounced the further the facet normal is from the viewing zone. The density will appear greater along an axis determined by the view vector and the facet normal vector, hence the point spacing can be expanded on this axis whilst still maintaining a sufficient density for the human eye to perceive the points as a continuum.

The current invention provides for the reduction of the point density of facets that are not face-on to at least a portion of the viewing zone, whilst still maintaining the apparent point density as seen by a viewer. This has the advantage that there is a reduction in the total number of points to be considered by the CGH computation process, a reduction in processing power, and hence cost, is achieved. This also means that it is quicker to produce a CGH.

Preferably, the amount of reduction, or dilution, of point density is directly proportional to the reduction in that apparent facet area that could be seen by the viewer. However, direct proportionality is not a requirement of the invention. A stepwise, or other reduction characteristic may have advantages, such as being quick to process.

CGH display systems are often not provided with a knowledge of the position of the viewer, so this cannot be used in calculating the dilution factor. Instead, a worst case scenario is assumed, where the viewer is assumed to be in that part of the view volume that has the best view of the particular facet being processed. That is, the facet is populated assuming it is being viewed from the point in the view volume where it appears to have the greatest area. This is the point where the facet will appear to be the least densely populated, and so must be populated adequately. In a CGH system, if a facet is not face-on to the viewing zone, then the point at which the facet is seen at it's largest will be somewhere at the rear face of view volume rear face.

The invention therefore provides a way to have the minimal density of points consistent with the resolving abilities of the human eye, yet avoid localised overpopulation or underpopulation of the object surface. The computational load is therefore reduced, and images can be displayed more quickly. The cost in time and monetary terms of displaying the image is reduced.

The invention is of particular use when implemented on a CGH system that uses an interference based algorithm. This is an algorithm whereby the CGH is designed to imitate the interference that occurs when a hologram is produced optically using coherent light.

According to another aspect of the invention there is provided a method of constructing a hologram comprising the steps of:

representing an object as a set of planar facets;

calculating which facets are not displayed face-on to a view volume;

applying a density of object points to each facet, where a reduced density is applied to those facets not displayed face-on to a view volume.

The method of the current invention may be implemented as a computer program running on a computer system. The program may be stored on a carrier, such as a hard disk system, floppy disk system, or other suitable carrier. The computer system may be integrated into a single computer, or may contain distributed elements that are connected together across a network.

According to further aspect of the invention there is provided a computer generated hologram display system wherein a surface of an object to be displayed is approximated by at least one planar facet, the facet having an associated point density, characterised in that the point density is reduced on the facet if a normal from any point on the facet projected towards the view volume cannot intersect with part of the view volume.

This CGH display system may be implemented on any suitable computer system. In particular, this computer system may be integrated into a single computer, or may contain distributed elements that are connected together using a network.

DETAILED DESCRIPTION OF THE INVENTION

One embodiment of the current invention will now be described in detail, by way of example only, with reference to the accompanying drawings, in which:

FIG. 1 diagrammatically illustrates a plan view of part of the display system, showing a facet with its normal vector N projected outside of the view volume, and a vector V projected into the view volume.

Figure 2:
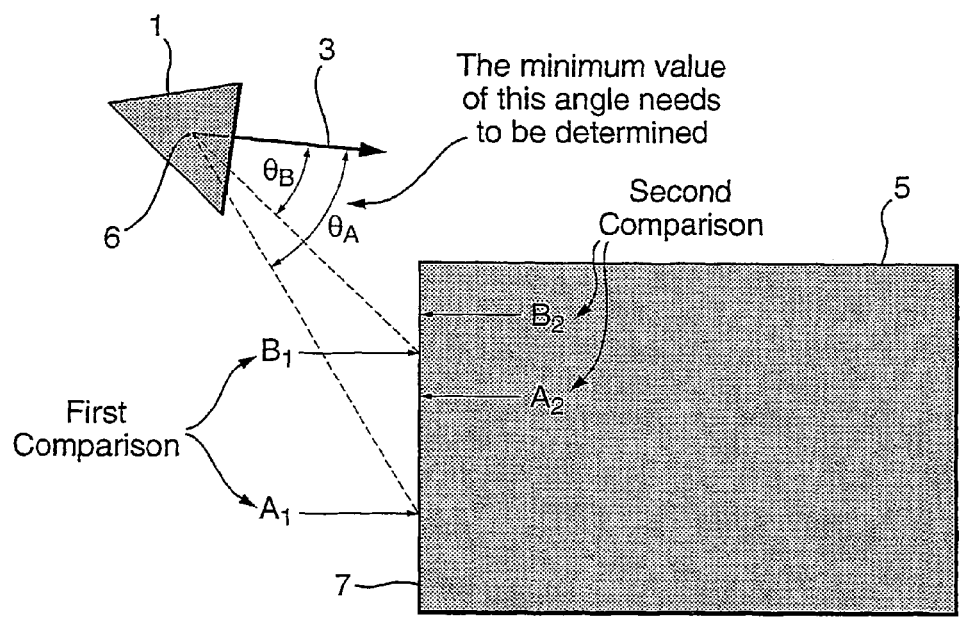

FIG. 2 illustrates the method currently used to find vector $V_{min}$.

Each facet needs to be examined to see if dilution can be applied to it. If a facet is found to have a normal that intersects with the view volume then to maintain sufficient density over all points in the view zone, it should not have it's point density reduced, and so it will be given a dilution factor of 1.0. For convenience, the present embodiment projects a normal from the centre of the facet in question, although generally any normal can be used. As the facets are in general very small, there is little error in doing this. FIG. 1 shows a facet 1 being projected by a display system comprising a CGH design plane (CDP) 8 and a lens 9, and having a normal 3 that does not intersect with the view volume 4. The view vector 2 is defined as the vector from the facet centre to the point on the rear face 5 of the viewing volume 4 where the view of the facet 1 is at its maximum. As, in this example, intersection from the normal 3 with the view volume 4 does not occur here, the dilution factor can be applied to the point population to save processing effort.

To determine the maximum dilution that can be applied to the facet in question 1, the vector $V_{min}$ needs to be found such that the angle θ between V 2 and N 1 is minimised. As a consequence of the geometry of the system, all vectors that enter the view volume 4 will pass through the rear face 5 of the view volume 4. The vector $V_{min}$ will always lie on the edge of the rear face 5 if N 1 does not itself pass through the view volume 4. Thus $V_{min}$ passes through the point on the rear face 5 of the view volume 4 where the facet 1 will be seen at its fullest. This point is found by a recursive, iterative, binary chop technique, discussed below.

The dilution factor d used in the current implementation is the cosine of the angle between these two vectors, i.e.

$$d = \cos(\theta) = \frac{N \cdot V_{min}}{\|N\| \cdot \|V_{min}\|} \quad (1)$$

Thus, the dilution is directly proportional to the apparent reduction in area of the facet 1 as seen from the closest point in the viewing volume to the facet normal 3.

The angle θ will always be no greater than 90°. Therefore, d will always be in the range $0 \leq d \leq 1$. The point density on the facet in question is therefore simply multiplied by the factor d.

This reduction in point density does have other implications to the complete object being displayed. If a CGH display is used, then the electric field distribution over the CGH from all points making up the object is given by the equation $$E = \sum_N \sum_{p=1}^{n_p} a_p r_p^{-1} \exp[i\phi_p] \text{Abs}[N_p \cdot V_p] \quad (2)$$

Here, the summation term N is the total number of pixels in the CGH, $n_p$ is the total number of visible object points for the given pixel being calculated. $a_p$ is the light amplitude for a given point p. $r_p$ is the distance between the object point to the CGH pixel. $\phi_p$ is the phase for that object point. The term $\text{Abs}[N_p \text{ dot } V_p]$ at the right of the equation acts as an obliquity factor to ensure energy conservation. $V_p$ is the vector from the object point to the particular pixel being calculated and $N_p$ is the normal vector from the pixel.

If a reduction in the number of points making up the CGH is made, as per the current invention, then it will be seen that from equation (2), the total electric field E will be reduced. This has the effect of making the observed object appear dimmer. To counter this, the obliquity factor term $\text{Abs}[N_p$ dot $V_p]$ is modified by dividing by d for those points that are in facets which have been diluted. Of course, in general, d will be different for each facet.

Thus the electric field distribution equation is now:

$$E = \sum_N \sum_{p=1}^{n_p} a_p r_p^{-1} \exp[i\phi_p] \text{Abs} \frac{[N_p \cdot V_p]}{d}$$

where d is the dilution factor applied to the facet containing point p. Energy conservation over the CGH is thus maintained.

FIG. 2 shows the method currently used to find the vector $V_{min}$. This is a vector from the facet centre 6 to the part of the view volume (4, not shown) where the facet 1 is seen most face-on. For a facet which cannot be seen fully face-on from anywhere, it will be seen most face-on from some point around an edge 7 of the rear face 5 of the view volume 4. The algorithm used by the CGH code finds this point by using a binary-chop method on each edge in turn. For each edge 7 it tests to see if the middle of one half can see more of the facet 1 than the other half. It then chooses the better half and repeats the test on that part and so on, each time getting closer until some arbitrary precision is reached. The cosine of the angle between this point to the facet mid-point and the facet normal is used as the dilution factor, as shown above.

The workings of the algorithm are as follows. The point along the edge 7 which forms the smallest angle from the facet 1 with respect to the facet normal 3 is found by a binary chop method. The midpoints of each half ($A_1$ and $B_1$) are tested and the better half is selected (the top half in this example). The midpoints of each half of this part ($A_2$ and $B_2$) are then tested and again the better half is selected. This process continues until the desired precision is reached.

Alternative methods can be used with the current invention. One possible alternative is to locate where the facet normal vector intersects the plane of the view volume rear face and then find the closest point on the rear face to this point.

The current invention has been implemented on an Active-Tiling® Computer Generated Hologram (CGH) display system, though any 3D display system could be used, if it is capable of displaying true 3D images, and uses arrays of points to make up surfaces. The computer system itself could be a standalone unit, or could have remote elements connected by a network.

The Active Tiling system is a means of producing holographic moving images by rapidly replaying different frames of a holographic animation. The Active Tiling system essentially comprises a system for directing light from a light source onto a first spatial light modulator (SLM) means and relaying a number of SLM subframes of the modulated light from the first high speed SLM means onto a second spatially complex SLM. The CGH is projected from this second SLM.

The full CGH pattern is split up into subframes in which the number of pixels is equal to the complexity of the first SLM. These frames are displayed time-sequentially on the first SLM and each frame is projected to a different part of the second SLM. The full image is thus built up on the second SLM over time. The first SLM means comprises an array of the first SLMs that each tile individual subframes on the second SLM over their respective areas.

Light from an SLM in the array must not stray onto parts of the second SLM not intended for it. To prevent this a shutter can be placed between the first SLM means and the second SLM, which masks off those areas of the second SLM that are not currently being written to. Alternatively, electrodes on the second SLM that cover the area where it is not wished to write an image can simply be not provided with a drive voltage. Thus any light that is falling onto the second SLM in these areas has no effect on the modulation layer. This avoids the need for a shutter system. The first SLM of such a system is of a type in which the modulation pattern can be changed quickly, compared to that of the second SLM. Thus its updating frame rate is greater than the read-out frame rate of the second SLM.

The Active Tiling system has the benefit that the image produced at the second SLM, which is addressed at a rate much slower than that of the first SLM array, is effectively governed by the operation of the first SLM. This permits a trade off between the temporal information available in the high frame rate SLMs used in the SLM array and the high spatial resolution that can be achieved using current optically addressed SLMs as the second SLM. In this way, a high spatial resolution image can be rapidly written to an SLM using a sequence of lower resolution images.

See PCT/GB98/03097 for a full explanation of the Active Tiling system.

The invention claimed is:

1. A memory having instructions stored thereon, wherein when the instructions are executed by at least one device, they are operable to:
   project a computer generated hologram (CGH) from a CGH design plane (CDP) capable of being viewed from a view volume, wherein the view volume is bounded by an angle of view of the CGH and a rear face oriented coplanar to the CDP;
   identify a planer facet of the CGH having a normal vector which does not intersect the rear face of the view volume; and
   operate on the CGH to reduce a point density on the planar facet, wherein point densities of planar facets having normal vectors which intersect the rear face are not reduced.

2. The memory according to claim 1 wherein the amount of reduction in point density is directly proportional to a reduction in the area of the facet that is within the angle of view of the view volume.

3. The memory according to claim 1 wherein the CGH is an interference based computer generated hologram.

4. The memory according to claim 1 wherein the normal projects from a center of the planar facet.

5. The memory according to claim 1 wherein the instructions are further operable to:
   increase a point intensity of the planar facet to compensate for a dimming effect of the reduced point density.

6. The memory according to claim 5 wherein the instructions are further operable to:
   maintain a conservation of energy over the entire CGH.

7. The memory according to claim 1 wherein the instructions are further operable to:
   identify a view vector originating at a center of the planar facet and extending through the rear face of the view volume; and
   determine a maximum dilution of the planar facet, wherein an angle between the normal vector and the view vector is minimized.

8. The memory according to claim 7 wherein the view vector is identified using a binary-chop method on one or more edges of the rear face of the view volume.

9. The memory according to claim 7 wherein the instructions are further operable to:
   determine a closest point on the rear face of the view volume to a point of intersection of the normal vector and a plane including the rear face of the view volume, wherein the view vector is identified as extending through the closest point.

10. A method comprising:
    representing a hologram as a set of planar facets;
    calculating which facets are not displayed face-on to a view volume;

applying a density of object points to each facet, where a reduced density is applied to those facets not displayed face-on to the view volume to generate a diluted facet; and adjusting a brightness of the diluted facet by dividing an obliquity factor associated with the diluted facet by a dilution factor, d, that is proportional to the reduction in point density of the diluted facet.

11. The method according to claim 10 wherein the brightness of the diluted facet is increased to maintain conservation of energy for the entire CGH.

12. The method according to claim 10 wherein the dilution factor d comprises a value less than or equal to one.

13. The method according to claim 10 further comprising:

identifying a view vector originating at a center of the diluted facet and extending through a rear face of the view volume, wherein the view vector provides a best view of the diluted facet; and determining a dilution of the diluted facet corresponding to the view vector.

14. The method according to claim 13 further comprising:

identifying a vector that is normal to the diluted facet, wherein an angle between the normal vector and the view vector is minimized when the dilution is maximized.

15. The method according to claim 14 further comprising:

determining a closest point on the rear face of the view volume to a point of intersection of the normal vector and a plane including the rear face of the view volume, wherein the view vector is identified as extending through the closest point.

16. The method according to claim 13 wherein the view vector is identified using a binary-chop method on one or more edges of the rear face of the view volume.

17. A computer generated hologram (CGH) display system comprising:

means for reducing a point density on a planar facet of a CGH object, wherein a normal from any point on the planar facet does not intersect with a view volume of the CGH display system; and means for adjusting an overall electric field distribution of the CGH object by increasing an obliquity factor associated with the planar facet proportional to the reduction in point density of the planer facet.

18. The CGH display system according to claim 17 wherein the increased obliquity factor compensates for a dimming of the planar facet due to the reduced point density.

19. The CGH display system according to claim 17 wherein the overall electric field distribution is adjusted to maintain energy conservation over the complete CGH object.

20. The CGH display system according to claim 17 further comprising:

means for identifying a view vector originating at a center of the planar facet and extending through a rear face of the view volume; and means for determining a maximum dilution of the planar facet, wherein an angle between the normal and the view vector is minimized.

21. The CGH display system according to claim 20 wherein the view vector is identified using a binary-chop method on one or more edges of the rear face of the view volume.

22. The CGH display system according to claim 20 further comprising:

means for determining a closest point on the rear face of the view volume to a point of intersection of the normal and a plane including the rear face of the view volume, wherein the view vector is identified as extending through the closest point.

* * * * *

UNITED STATES PATENT AND TRADEMARK OFFICE
CERTIFICATE OF CORRECTION

PATENT NO. : 7,417,634 B2
APPLICATION NO. : 11/483980
DATED : August 26, 2008
INVENTOR(S) : Colin D. Cameron It is certified that error appears in the above-identified patent and that said Letters Patent is hereby corrected as shown below:

At column 6, line 21, delete "planer" and insert -- planar --, therefor.

Signed and Sealed this

Twenty-ninth Day of September, 2009

David J. Kappos
*Director of the United States Patent and Trademark Office*